Patented Dec. 16, 1930

1,785,173

UNITED STATES PATENT OFFICE

HAROLD J. BARRETT, OF WILMINGTON, DELAWARE, ASSIGNOR, BY MESNE ASSIGNMENTS, TO THE GRASSELLI CHEMICAL COMPANY, OF CLEVELAND, OHIO, A CORPORATION OF DELAWARE

SOLDERING FLUX

No Drawing.  Application filed May 7, 1930.  Serial No. 450,596.

The uniting of metals by soft soldering operations requires the use of a flux to produce adhesion of the solder to the metal. The efficiency of a flux depends upon various factors, mainly its power to dissolve the oxide films on the metals and its power to wet the metals whereby the solder is caused to spread and achieve the greatest contact between solder and the metals to be united.

Practical experience has shown that certain natural resinous substances, as well as zinc chloride alone or in admixture with various inorganic salts, have efficient fluxing properties. These well known fluxes have no chemical or physical properties in common from which conclusions could be drawn as to which other compounds would or would not act as efficient fluxes in soft soldering operations.

I have found that polymerized organic esters of vinyl alcohol have excellent fluxing properties and my invention comprises soft soldering operations in which a polymerized organic ester of vinyl alcohol is used as the flux and the novel fluxes themselves.

Organic esters of vinyl alcohol, such as vinyl formate, vinyl acetate, vinyl propionate and vinyl butyrate are easily polymerized to form chemically heterogeneous non-crystalline bodies. They are usually tough, horny resins, substantially insoluble in water, but soluble to various degrees in common organic solvents. The physical properties of the polymers and their solutions depend to a certain extent upon the degree of polymerization, but these differences do not seem to affect greatly the fluxing properties of the polymers.

Among the broad class of polymers of organic esters of vinyl alcohol I have found that the compounds from aliphatic acids, such as exemplified above, and among them polymerized vinyl acetate, are very convenient for use as fluxes.

When applied to metal surfaces to be united by a soft soldering operation the polymerized organic esters of vinyl alcohol give a good spread of the solder, and a firm bond between the metals is obtained.

Polymerized vinyl formate, acetate, propionate, etc., are applied as fluxes in the same manner as ordinary rosin fluxes. They can be reduced to powder and sprinkled over the work, or their solutions in organic solvents can be used and brushed upon the work. It is also possible to emulsify in various manners these polymers in water and use such emulsions as fluxes.

Polymerized vinyl acetate produces, for instance, an excellent solder on tin plate using 50—50 tin-lead solder. It is also efficient on copper, steel, aluminum, or galvanized iron.

While in general my novel fluxes can be used in the same manner as rosin fluxes, it should be understood that slight departures from standard practice might be required when using polymerized organic esters of vinyl alcohol as fluxes, but these are entirely within the knowledge of those versed in the soldering art.

I claim:

1. In a process of soft soldering, the step of applying a flux comprising a polymerized organic ester of vinyl alcohol.

2. In a process of soft soldering, the step of applying a flux comprising a polymerized aliphatic acid ester of vinyl alcohol.

3. In a process of soft soldering, the step of applying a flux comprising polymerized vinyl acetate.

4. A soldering flux comprising a polymerized organic ester of vinyl alcohol.

5. A soldering flux comprising a polymerized aliphatic acid ester of vinyl alcohol.

6. A soldering flux comprising polymerized vinyl acetate.

In testimony whereof, I affix my signature.

HAROLD J. BARRETT.